(12) United States Patent
Manson

(10) Patent No.: US 6,517,018 B2
(45) Date of Patent: Feb. 11, 2003

(54) COMMINUTING DEVICE

(76) Inventor: Joel Manson, 20 Clematis Road, Willowdale. Ontario (CA), M2J 4X2

( * ) Notice: Subject to any disclaimer, the term of this patent is extended or adjusted under 35 U.S.C. 154(b) by 0 days.

(21) Appl. No.: 09/891,807

(22) Filed: Jun. 26, 2001

(65) Prior Publication Data

US 2003/0006328 A1 Jan. 9, 2003

(51) Int. Cl.$^7$ ............................................... A01D 34/90
(52) U.S. Cl. ...................................... 241/169.1; 99/510
(58) Field of Search ........................... 99/510; 241/168, 241/169, 169.1

(56) References Cited

U.S. PATENT DOCUMENTS

| | | | | |
|---|---|---|---|---|
| 795,746 | A | * | 7/1905 | Wingfield et al. ....... 241/169.1 |
| 824,058 | A | * | 6/1906 | Bain ........................ 241/169.1 |
| 3,581,790 | A | * | 6/1971 | Del Conte ............... 241/169.1 |
| 6,302,014 | B1 | * | 10/2001 | Kuan ........................... 99/510 |

* cited by examiner

Primary Examiner—W. Donald Bray
(74) Attorney, Agent, or Firm—Bazerman & Drangel, PC

(57) ABSTRACT

A device for comminuting material comprising first and second mating sections. The mating sections when mated form an enclosed interior chamber with the first and second sections capable of movement relative to each other. The first mating section has a first set of a plurality of pins, which extend from a base of the first mating section and into the interior of the chamber. Similarly, the second mating section has a second set of a plurality of pins extending from a base of the second mating section and into the interior of the chamber. The pins from the first mating section interdigitate with the second set of a plurality of pins when the first and second mating sections are mated, wherein movement of the first and second mating sections relative to one another causes comminution of the material when placed in the chamber. The pins have varying cross-sectional shapes including circular, triangular, and hexagonal.

13 Claims, 6 Drawing Sheets

SECTION B-B

SECTION A-A

SECTION C-C

SECTION C-C

COMMINUTING DEVICE

BACKGROUND OF THE INVENTION

1. Field of the Invention

This invention relates to the comminution of raw materials.

2. Prior Art

Numerous attempts have been made for comminuting raw material into a desired particulate size. One problem with such attempts is their susceptibility to jamming. Another problem with such devices is the presence of numerous mechanical parts, each of which are susceptible to wear and tear and replacement of the individual parts can be expensive. Some of these devices are also large and thus not easily portable.

SUMMARY OF THE INVENTION

According to the present invention, there is provided a device for comminuting material comprising first and second mating sections. The mating sections when mated form an enclosed interior chamber with the first and second sections capable of movement relative to each other. The first mating section has a first set of a plurality of pins, which extend from a base of the first mating section and into the interior of the chamber. Similarly, the second mating section has a second set of a plurality of pins extending from a base of the second mating section and into the interior of the chamber. The pins from the first mating section interdigitate with the second set of a plurality of pins when the first and second mating sections are mated, wherein movement of the first and second mating sections relative to one another causes comminution of the material when placed in the chamber.

According to another embodiment of the present invention, there is provided a plurality of pins having at least one planar facet, more preferably be multi-planar faceted, and most preferably be either triangular or hexagonal. The first and second sets of a plurality of pins are preferably substantially perpendicular to the base of their respective mating sections, although the pins can also be placed at an angle relative to the base. If the pins are angled, the angle at which the first set of a plurality of pins is placed relative to the base of the first mating section is complementary to the angle at which the second set of a plurality of pins is placed relative to the base of the second mating section.

In yet another embodiment, the pins are removably fixed to their respective bases, thus allowing pins of various shapes and sizes to be easily inter-changed.

In yet another embodiment, a method of determining the configuration of a plurality of pins in a cylindrical comminuting device having a first and second mating section, the method comprising the steps of:

1) determining the configuration in a first mating section of a first set of a plurality of pins by:
    a) selecting parameters of the first mating section such that the relationship $D=(n)(d)+S(n-1)+2F$ is satisfied;
    b) determining the maximum number of orbits, O, of said pins for the mating sections such that $O=(n-1)/2;$ where parameter:
  D is an internal diameter of the first mating section,
  d is the maximum cross-sectional distance of a pin,
  S is the minimum distance between a pair of interdigitating adjacent pins,
  n is the total integral odd number of interdigitating pins along a major axis of said mating sections, 2) determining the radius of total orbits when said first and second sections are mated such that $R=2(n)(d+S),$ where parameter:
  R is the radius of an orbit,
  n is the $n^{th}$ orbit; and 3) configuring a second set of a plurality of pins in a second mating section such that the first set of pins and second set of pins have a distance S when said first and second sections are mated and said first mating section having even $R_n$ orbits and said second mating section having odd $R_n$ orbits.

The invention also provides for a kit for comminuting material, wherein such kit comprises first and second mating sections. The first and second mating sections when mated are capable of forming an enclosed interior chamber with the sections capable of movement relative to each other. A plurality of sets of pins capable of being removably fixed to a base each of the first and second mating sections; are also provided with the kit.

In another embodiment, the sets of pins to be included with the kit comprise a plurality of sets of pins for both the first and second mating sections and further comprise pins of a plurality of shapes and sizes.

BRIEF DESCRIPTION OF THE DRAWINGS

These and other features of the preferred embodiments of the invention will become more apparent in the following detailed description in which reference is made to the appended drawings by way of example only, wherein.

DETAILED DESCRIPTION OF THE INVENTION

Figure 1:
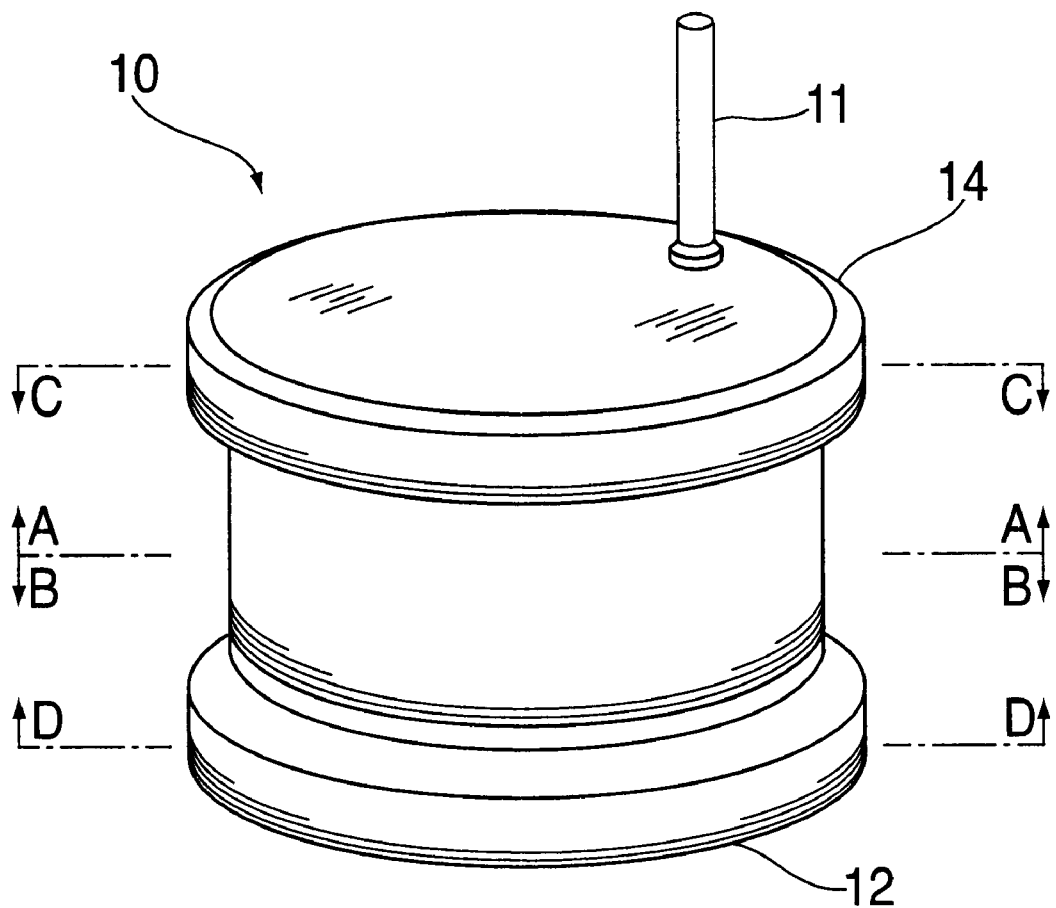
FIG. 1 is a perspective view of an assembled comminuting device.
Figure 3:
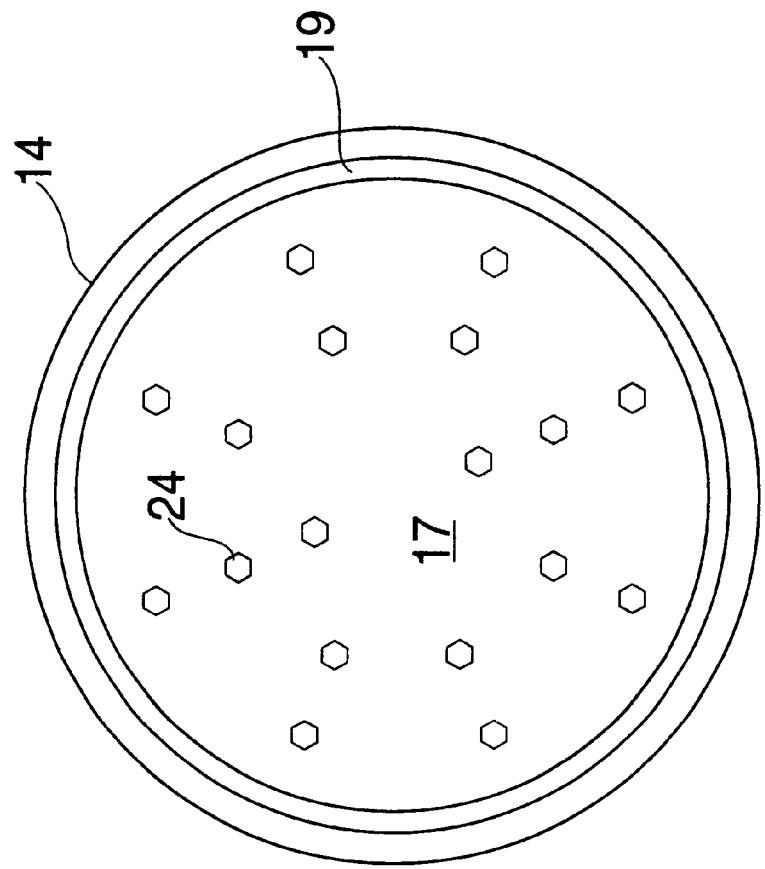
FIG. 3 is a section view on B—B of FIG. 2.
Figure 2:
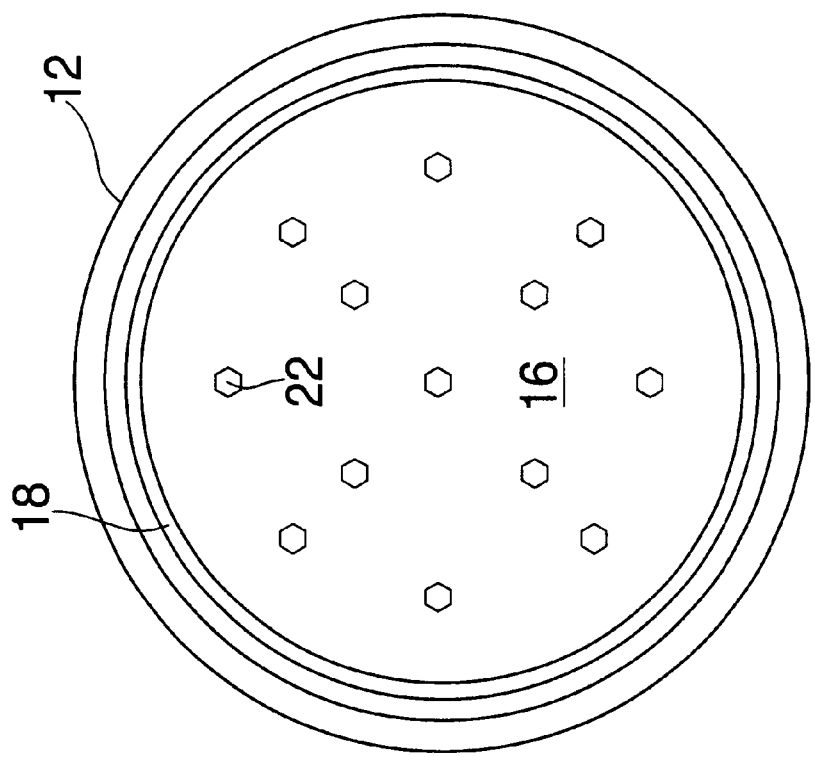
FIG. 2 is a section view on A—A of FIG. 2.

Referring to FIG. 1, the device is generally shown at 10. The device includes a first mating section 12 and a second mating section 14 shown in FIGS. 2 and 3 respectively. Each of mating sections 12,14 have a respective base 16,17 and a respective wall 18,19, which are substantially perpendicular to the base 16,17. Mating sections 12,14 when assembled form a fully enclosed chamber 20 shown in FIG. 6. Each of mating sections 12,14 have a set of a plurality of pins 22,24 which are capable of either being permanently or removably fixed to base 16,17 of mating sections 12,14 respectively. It is preferred that pins 22,24 be substantially perpendicular to the base 16,17. A handle 11 can be connected to at least one of the mating sections 12, 14 to facilitate operation of the device 10.

Figure 4:
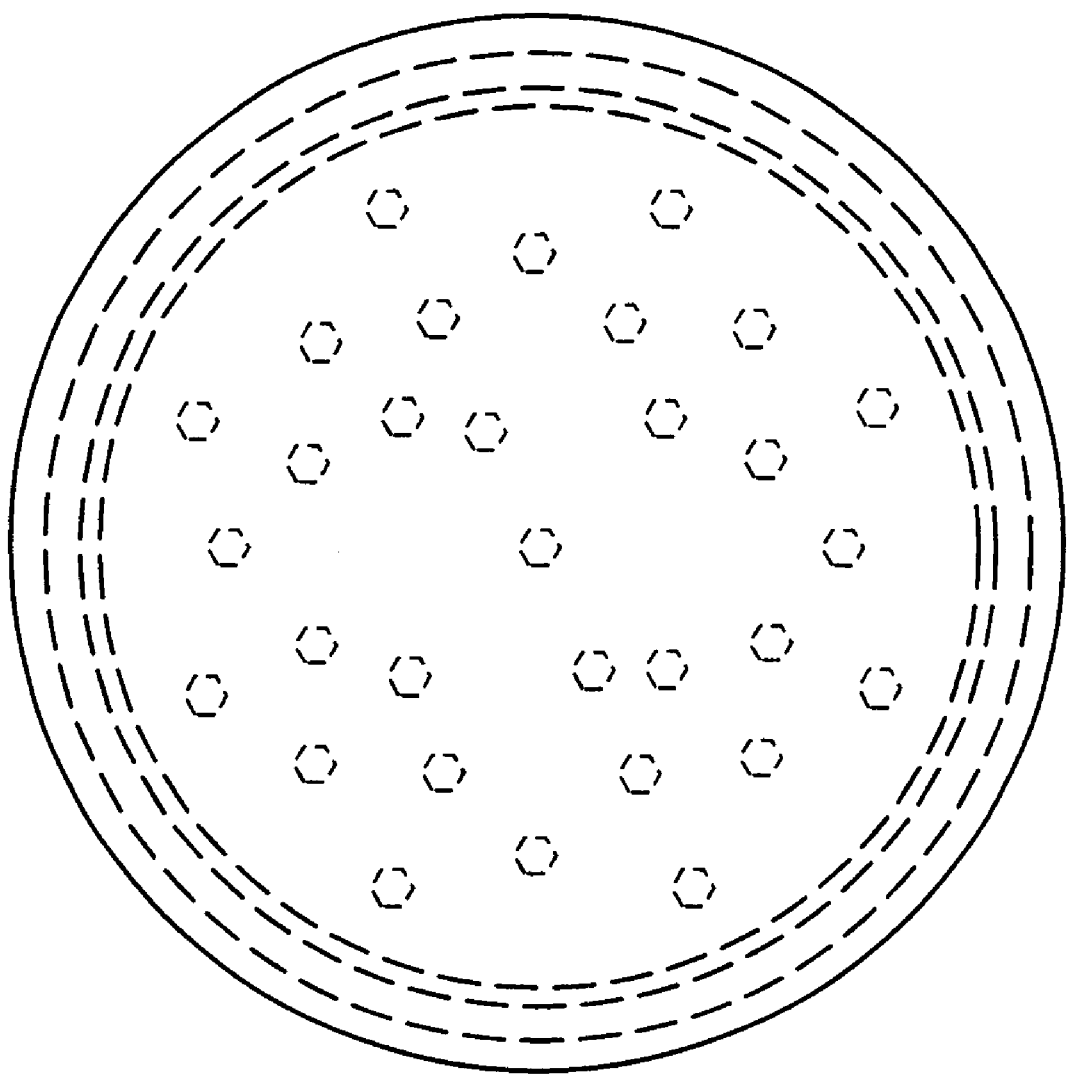
FIG. 4 is a section view on C—C of FIG. 1 in a first orientation.
Figure 5:
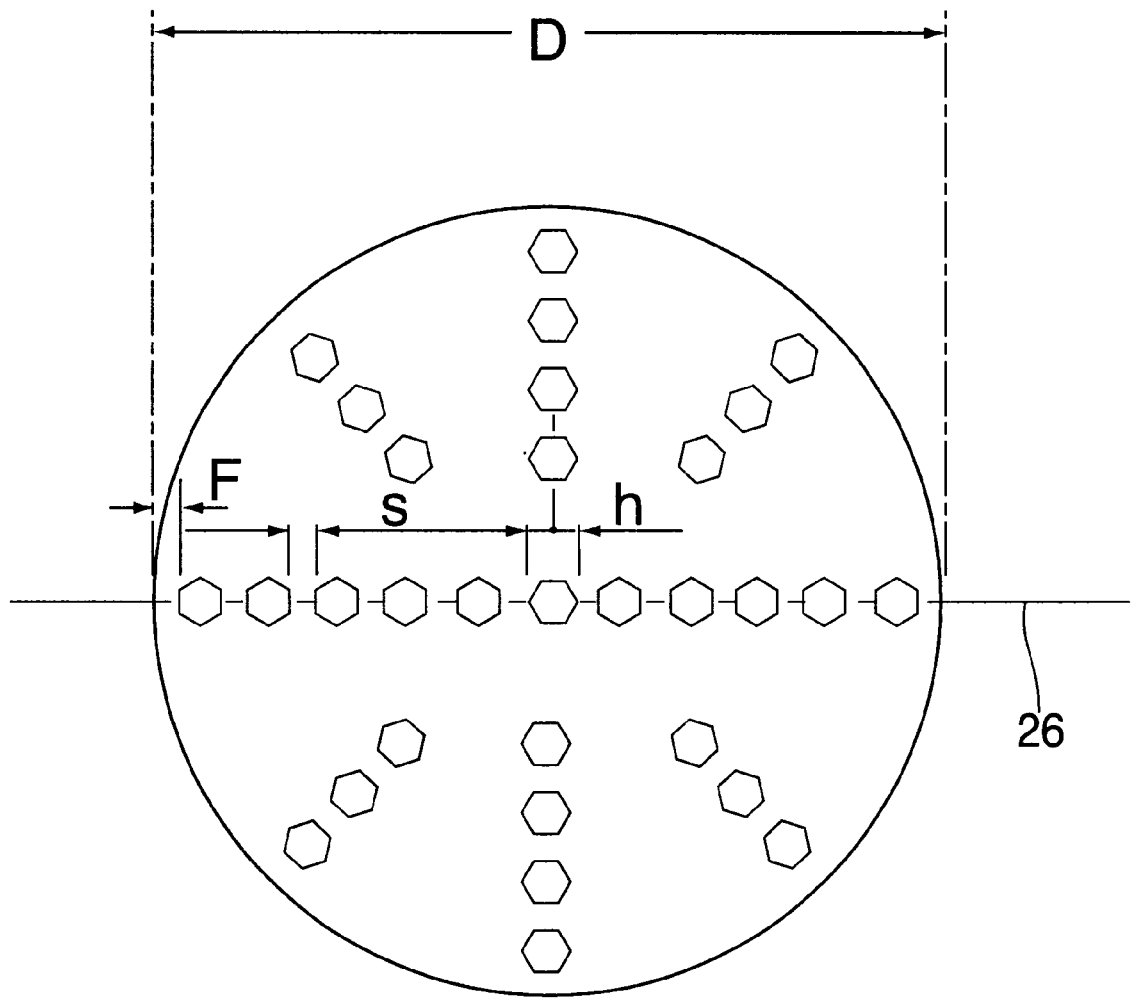
FIG. 5 is a section view on C—C of FIG. 1 in a second orientation.
Figure 6:
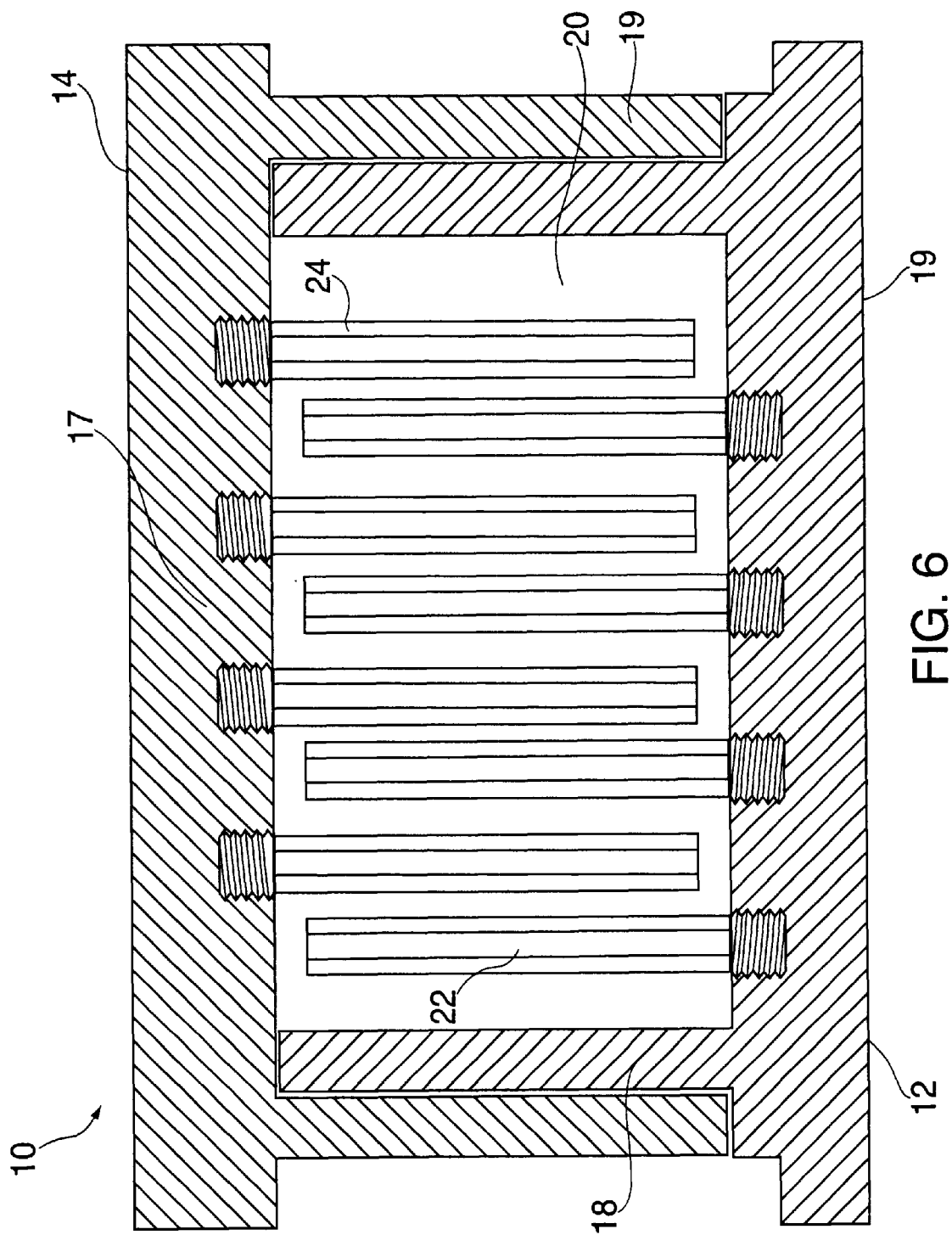
FIG. 6 is a section view on D—D of FIG. 1.

When mating sections 12,14 are assembled to form device 10, pins 22,24 interdigitate as shown in FIG. 6. In another embodiment, device 10 is cylindrical, such that mating sections 12,14 are capable of 360° movement each relative to the other. The position of pins 22,24 relative to each other in two orientations of the mating sections 12,14 can be seen in FIGS. 4 and 5. Pins 22,24 may also be removably fixed at an angle to base 16,17. When fixed at an angle, pins 22,24 are at angles complementary to each other, thereby allowing free movement of each mating section 12,14 relative to each other over 360°, or other degree of movement configurations as desired. Although it is preferable that base 16,17 be substantially planar, one of the bases 16,17 may also be dome shaped, allowing for a chamber with a larger volume. In such an embodiment, the pins 22,24 extending from the center of the dome shaped section can be longer than the pins extending from the periphery of the dome.

In one embodiment, the wall 18 of the first or male mating section 12 is smaller in diameter than wall 19 of the second or female mating section 14, thus allowing for the female mating section 14 to be slidably engaged over the male mating section 12.

In one embodiment, the pins 22,24 are cylindrical. Alternatively, the pins 22,24 can be of any polygonal shape. For example, in one embodiment, the pins 22,24 are hexagonal in cross-section. It has been found that the edges between the facets of the hexagon facilitate the interations between material and the pins 22,23 and thereby providing more efficient comminuting of material when compared to comminuting of material with cylindrically shaped pins. The pins 22,24 may also be, but not limited to other faceted pins 22,24 such as triangular or pentagonal in cross-section. The pins 22,24 may be manufactured out of any material as long as the pins do not snap off when the device 10 is in operation. Such materials may include but are not limited to titanium, aluminum and alloys of metals. The pins 22, 24 may also be coated with substances such as teflon, chromium, gold or silver. If the comminuting device 10 is to be used for material that is to be consumed, the coating should be bio-compatible. The material for comminution can be such as but not limited to herbs, nuts, granular spices, and food stuffs or condiments for which mechanical processing is desired.

To operate the device 10, the material to be comminuted is placed in either mating sections 12,14. While the material to be comminuted can be placed in either sections 12,14, it is preferable that the material be placed in the male mating section 12 first. This will allow proper placement of the female mating section 14 over the male mating section 12 without any interference from the material to be comminuted. In order to now comminute the material, the sections 12,14 are moved relative to each other, until the size of the particulate material desired is obtained. Of course, the distance between the interdigitating pins 22,24 must be smaller than the original size of the material to be comminuted. If smaller particulate material is desired, one only has to transfer the already comminuted material to a new device 10 in which the distance between the interdigitating pins is smaller than the one before, or the pins 22,24 can be removed and replaced by pins with a larger cross-sectional diameter, thus making the distance between the interdigitating pins smaller. In one embodiment where the sections 12,14 are cylindrical, the sections can be moved 360° relative to one another. Alternatively, the circular sections can also be translated back and forth in a somewhat linear fashion to comminute the material in chamber 20. If the sections 12,14 are rectangular, the sections 12,14 can be translated back and forth along a selected axis.

In one embodiment, a method is provided for determining the configuration of pins 22 in the male circular mating section 12 the method comprising the steps of:

1) determining the configuration in a first mating section of a first set of a plurality of pins by:
   a) selecting parameters of the male mating section 12 such that the relationship $$D=(n)(d)+S(n-1)+2F$$

is satisfied;
   b) determining the maximum number of orbits, O, of the pins for the mating sections such that $$O=(n-1)/2;$$

where parameter:
   D is an internal diameter of the male mating section 12,
   d is the maximum cross-sectional distance of a pin 22, 24,
   S is the minimum distance between a pair of interdigitating adjacent pins 22,24,
   n is the total integral odd number of interdigitating pins along a major axis 26 of the mating sections, and
   F is the distance between the pin 24 in the furthest orbit of the female section 14 and the inside of the wall of the male section 12, 2) determining the radius of total orbits when the first and second sections are mated such that $$R=2(n)(d+S),$$

where parameter:
   R is the radius of an orbit,
   n is the $n^{th}$ orbit; and 3) configuring a second set of a plurality of pins 24 in the female mating section 14 such that the first set of pins 22 and second set of pins 24 have a distance S when the male and female mating sections 12,14 are mated and the male mating section 12 has even R, orbits and the female mating section has odd R, orbits.

Accordingly, the following examples are offered by way of illustration, not by way of limitation.

EXAMPLE 1

Any size of the comminuting device and the configuration of the pins 22 in the male mating device 12 can be easily determined by using the formulas described above. Thus, if a male mating section 12 whose internal diameter, D, is 35 mm, F is 0.75 mm, and each pin 22 has a diameter, d, of 1.4 mm with a desired spacing, S, between the interdigitating pins of the assembled device of 1.6 mm, then the total integral odd number of pins required for the assembled device along the major axis of the device would be:

$$35=(n)(1.4)+1.6(n-1)+2(0.75)$$

$$35=1.4n+1.6n-1.6+1.5$$

$$35=3.0n-0.1$$

$$3.0n=35+0.1$$

$$3.0n=35.1$$

$$n=11.7$$

Since n should be an odd integer, the value of n is rounded off to the nearest odd integer. In this instance n should be 11. In the event that that the value of n is an even number, the value of n is rounded off to the nearest odd integer. Thus, if the value of n for a different set of parameters works out to be 12.2, then n should be rounded off to the nearest odd integer. Such number could be either 11 or 13.

In this example, for 11 pins, the number of orbits, O, concentric with the central pin is determined by the formula:

$$O=(n-1)/2$$

$$O=(11-1)2$$

$$O=10/2$$

$$O=5$$

The radius, R, of each of the five (5) orbits is then determined by the formula:

$$R_n=2(n)(d+S)$$

where, n is the $n^{th}$ orbit. Thus, the radius of the first, inner most orbit, is:

$$R_1=2(1)(1.4+1.6)$$

$$R_1=2(3)$$

$$R_1=6 \text{ mm},$$

the radius of the second innermost orbit, is:

$$R_2=(2)(2)(1.4+1.6)$$

$$R_2=(4)(3)$$

$$R_2=12 \text{ mm},$$

similarly, $R_3=18$ mm, $R_4=24$ mm, and $R_5=30$ mm.

The pins in the female mating section 14 will then be configured such that they interdigitate with the pins configured in the male mating section 12, as well as using the orbit O=5 determined above. The female mating section 14 will have orbits of radii $R_1$, $R_3$, and $R_5$, and the male mating section 12 will have orbits of radii $R_2$ and $R_4$, with the center pin in the male mating section 12 being $R_0$.

EXAMPLE 2

If it is desired to determine the internal diameter of a male mating section 12 of a comminuting device described herein, knowing that the number, n, of pins to be used is 15, and the diameter, d, of each pin is 1.38 mm, with the spacing, S, between interdigitating pins is 1.62 mm, and F is 0.75 mm, then the internal diameter, D, of the male mating section 12 can be calculated as follows:

$$D=(n)(d)+S(n-1)+2F$$

$$D=(15)(1.38)+1.62(15-1)+2(0.75)$$

$$D=20.7+22.68+1.5$$

$$D=44.88 \text{ mm}$$

The number of orbits, O, concentric with the central pin is:

$$O=(n-1)/2$$

$$O=(15-1)/2$$

$$O=14/2$$

$$O=7$$

and the radius, R, of each of the seven (7) orbits is next determined by the formula:

$$R=2(n)(d+S)$$

where, n, is the $n^{th}$ orbit. Thus, the radius of the first, inner most orbit, is:

$$R_1=2(1)(1.38+1.62)$$

$$R_1=2(3)$$

$$R_1=6 \text{ mm},$$

the radius of the second innermost orbit, is:

$$R_2=(2)(2)(1.38+1.62)$$

$$R_2=(4)(3)$$

$$R_2=12 \text{ mm},$$

similarly, $R_3=18$ mm, $R_4=24$ mm, $R_5=30$ mm, $R_6=36$ mm, and $R_7=42$ mm.

The pins in the female mating section 14 will then be configured such that they interdigitate with the pins configured in the male mating section 12. The female mating section 14 will have orbits of radii $R_1$, $R_3$, $R_5$, and $R_7$, and the male mating section 12 will have orbits of radii $R_2$, $R_4$, and $R_6$ with the center pin in the male mating section 12 being $R_0$.

Figure 7:
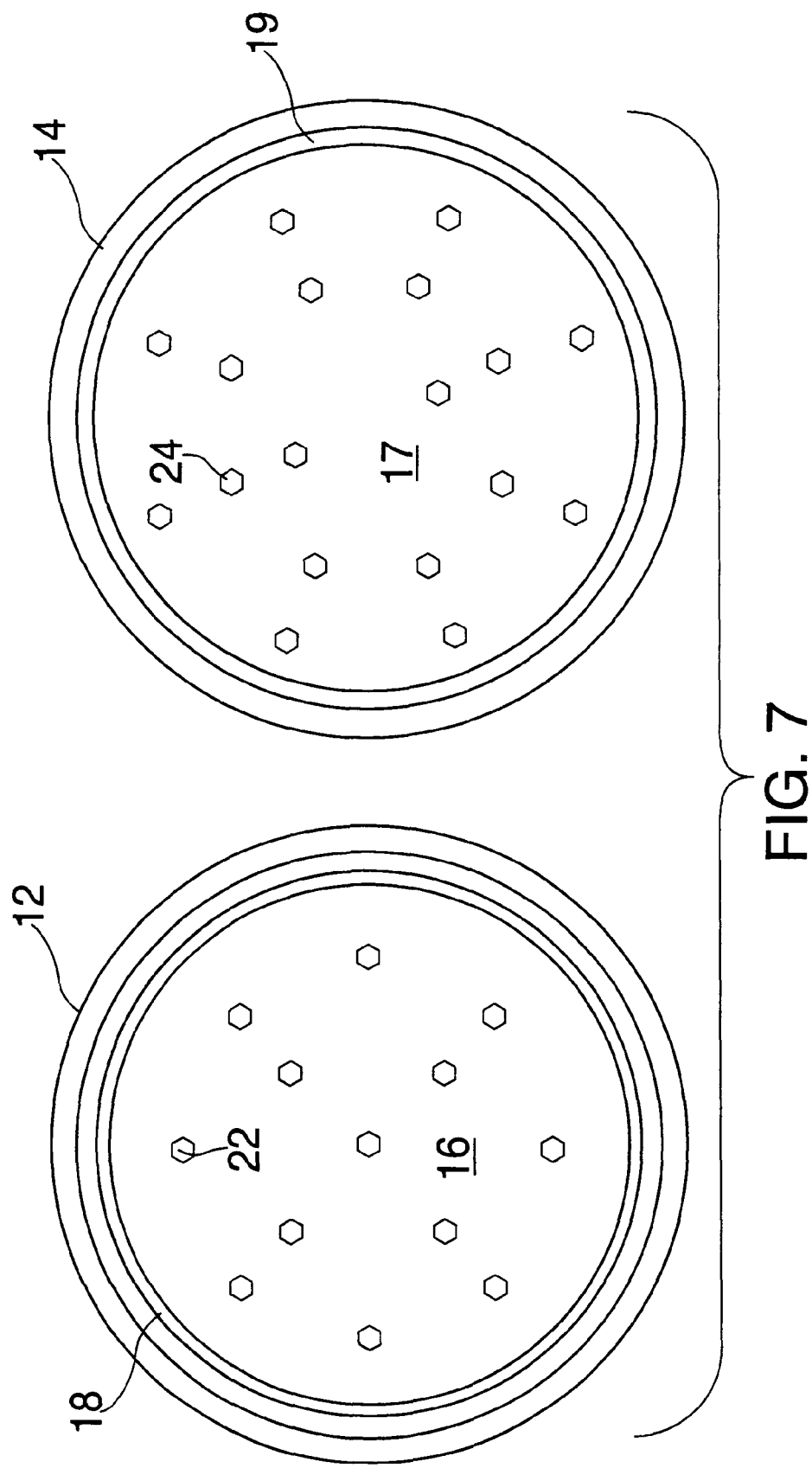
FIG. 7 is a further embodiment of the device of FIGS. 2 and 3.

In a further embodiment shown in FIG. 7, the device 10 has a plurality of pins 22, 24 of circular cross-section. The positioning of these pins 22, 24 on their respective bases 16, 17 can be determined by the pin configuration method as described above. It is also recognized that any modifications of the device 10 described above can be done occurring to those skilled in the art without departing from the spirit of the invention as claimed. It is also recognized that pins 22, 24 can comprise various differently shaped cross-sections for use in the single device 10.

I claim:

1. A device for comminuting material comprising:
   first and second mating sections;
   said mating sections when mated forming an enclosed interior chamber with said sections capable of movement relative to each other;
   said first mating section having a first set of a plurality of pins extending from a base of first mating section and into the interior of said chamber;
   said second mating section having a second set of plurality of pins extending from a base of second mating section and into the interior of said chamber; and
   said first set of pins interdigitating with said second set of pins, wherein movement of the first and second mating sections relative to one another causes comminution of the material when placed in the chamber;
   wherein said first and second set of pins are removably fixed to said first and second base.

2. The device of claim 1, wherein said first and second set of pins are substantially perpendicular to said base of each first and second mating sections.

3. The device of claim 1, wherein said first and second set of pins are angled relative to said base of each first and second mating section such that the angle of the first set of pins is complementary to the angle of the second set of pins.

4. The device of claim 2, wherein said pins are multi-faceted.

5. The device of claim 3, wherein said pins are multi-faceted.

6. The device of claim 4, wherein said pins are triangular.

7. The device of claim 5, wherein said pins are triangular.

8. The device of claim 4, wherein said pins are regular polygons.

9. The device of claim 5, wherein said pins are regular polygons.

10. The device of claim 8, wherein said regular polygons are hexagons.

11. The device of claim 9, wherein said regular polygons are hexagons.

12. A method of determining the configuration of a plurality of pins in a cylindrical comminuting device having a first and second mating section, the method comprising the steps of:

1) determining the configuration in a first mating section of a first set of the plurality of pins by:
   a) selecting parameters of the first mating section such that the relationship $$D=(n)(d)+S(n-1)+2F$$

is satisfied;
   b) determining the maximum number of orbits, O, of the pins for the mating sections such that $$O=(n-1)/2;$$

where parameter:
   D is an internal diameter of the first mating section,
   d is the maximum cross-sectional distance of a pin,
   S is the minimum distance between a pair of interdigitating adjacent pins,
   n is the total integral odd number of interdigitating pins along a major axis of the mating sections, and
   F is the distance between said pin in the furthest orbit of the second section and the inside wall of the first section;

2) determining a radius of total orbits when the first and second sections are mated such that $$R=2(n)(d+S),$$

where parameter:
   R is the radius of an orbit,
   n is the $n^{th}$ orbit; and 3) configuring a second set of the plurality of pins in the second mating section such that the first set of pins and the second set of pins have a distance S when the first and second sections are mated and the first mating section having even $R_n$ orbits and the second mating section having odd $R_n$ orbits.

13. A kit for comminuting material comprising:

first and second mating sections;

said first and second mating sections when mated are capable of forming an enclosed interior chamber with said sections capable of movement relative to each other;

a plurality of sets of pins capable of being removably fixed to a base of each of the first and second mating sections;

whereby once assembled the pins on the first mating section can interdigitate with the pins on the second mating section, wherein movement of the first and second mating sections relative to one another causes comminution of the material when placed in the chamber;

wherein said sets of pins further comprise a plurality of sets of a plurality of shapes and sizes.

* * * * *